US009822928B2

(12) United States Patent
Thunhorst et al.

(10) Patent No.: US 9,822,928 B2
(45) Date of Patent: Nov. 21, 2017

(54) COMPOSITE PRESSURE VESSELS

(75) Inventors: Kristin L. Thunhorst, Stillwater, MN (US); Emily S. Goenner, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 419 days.

(21) Appl. No.: 13/154,615

(22) Filed: Jun. 7, 2011

(65) Prior Publication Data
US 2011/0309074 A1 Dec. 22, 2011

Related U.S. Application Data

(60) Provisional application No. 61/355,769, filed on Jun. 17, 2010.

(51) Int. Cl.
*F17C 1/06* (2006.01)
*F17C 1/16* (2006.01)

(52) U.S. Cl.
CPC ........ *F17C 1/16* (2013.01); *F17C 2201/0109* (2013.01); *F17C 2201/0128* (2013.01); *F17C 2201/058* (2013.01); *F17C 2203/0604* (2013.01); *F17C 2203/0607* (2013.01); *F17C 2203/067* (2013.01); *F17C 2203/0624* (2013.01); *F17C 2203/0643* (2013.01); *F17C 2203/0646* (2013.01); *F17C 2203/0648* (2013.01); *F17C 2203/0665* (2013.01); *F17C 2203/0673* (2013.01); *F17C 2203/0697* (2013.01); *F17C 2209/2163* (2013.01); *F17C 2209/221* (2013.01); *F17C 2209/227* (2013.01); *F17C 2221/011* (2013.01); *F17C 2223/0123* (2013.01); *F17C 2223/035* (2013.01); *F17C 2223/036* (2013.01); *F17C 2260/053* (2013.01); *F17C 2270/05* (2013.01); *F17C 2270/07* (2013.01)

(58) Field of Classification Search
CPC .... B29C 63/24; F17C 1/00; F17C 1/16; F17C 1/04; B65D 1/16; B65D 8/00; B65D 8/08; B32B 27/08
USPC .................. 220/588–592; 228/184
See application file for complete search history.

(56) References Cited

U.S. PATENT DOCUMENTS

| | | | |
|---|---|---|---|
| 4,589,562 A | 5/1986 | Fawley | |
| 4,699,288 A | 10/1987 | Mohan | |

(Continued)

FOREIGN PATENT DOCUMENTS

| | | |
|---|---|---|
| CN | 201140876 | 10/2008 |
| JP | H06-171042 | 6/1994 |

(Continued)

OTHER PUBLICATIONS

Mahrholz, J., et al., "Fibre-Reinforced Nanocomposites for Space Structures," European Conference on Spacecraft Structures, May 12, 2005, 10 pages.

(Continued)

*Primary Examiner* — J. Gregory Pickett
*Assistant Examiner* — Kaushikkumar Desai
(74) *Attorney, Agent, or Firm* — Dena M. Ehrich; Philip Y. Dahl

(57) ABSTRACT

Pressure vessels formed from fiber composites are described. The fiber composites include fibers impregnated with a resin system containing surface-modified nanoparticles dispersed in a curable matrix resin.

19 Claims, 2 Drawing Sheets

(56) References Cited

U.S. PATENT DOCUMENTS

| | | | |
|---|---|---|---|
| 5,648,407 A | | 7/1997 | Goetz |
| 6,074,595 A | * | 6/2000 | Eisberg et al. ............... 264/496 |
| 6,342,100 B1 | * | 1/2002 | Nover et al. ................. 106/464 |
| 2003/0111473 A1 | * | 6/2003 | Carter et al. ................. 220/586 |
| 2004/0052997 A1 | | 3/2004 | Santo |
| 2004/0092639 A1 | * | 5/2004 | Kasahara et al. ............ 524/425 |
| 2004/0149759 A1 | | 8/2004 | Moser |
| 2004/0206762 A1 | | 10/2004 | Lida et al. |
| 2004/0242748 A1 | * | 12/2004 | Takahashi et al. ........... 524/425 |
| 2005/0260373 A1 | * | 11/2005 | DeLay et al. ................ 428/36.4 |
| 2007/0205201 A1 | | 9/2007 | Cundiff |
| 2007/0215841 A1 | * | 9/2007 | Ford et al. ................... 252/503 |
| 2007/0258877 A1 | * | 11/2007 | Nover et al. ................. 423/430 |
| 2008/0160302 A1 | * | 7/2008 | Asrar et al. .................. 428/375 |
| 2008/0252980 A1 | * | 10/2008 | Hebrink et al. ............. 359/599 |
| 2009/0266823 A1 | | 10/2009 | Mazabraud et al. |
| 2012/0119420 A1 | * | 5/2012 | Rossignol et al. ............ 264/434 |

FOREIGN PATENT DOCUMENTS

| | | | |
|---|---|---|---|
| JP | H08-34554 | | 2/1996 |
| JP | 8-239555 | | 9/1996 |
| JP | 10-067911 | | 3/1998 |
| JP | 2001-123043 | | 5/2001 |
| JP | 2005-180605 | | 7/2005 |
| JP | 2005-324481 | | 11/2005 |
| JP | 2008-037951 | | 2/2008 |
| JP | 2008-101051 | | 5/2008 |
| JP | 2008-304038 | | 12/2008 |
| JP | 1010-111859 | | 5/2010 |
| WO | WO2008/027979 | * | 3/2008 |
| WO | WO 2008/109006 | | 9/2008 |
| WO | WO 2009/120846 | | 10/2009 |
| WO | WO 2009/152404 | | 12/2009 |
| WO | WO 2010/008931 | | 1/2010 |
| WO | WO 2010/080459 | | 7/2010 |
| WO | WO 2010/138440 | | 12/2010 |

OTHER PUBLICATIONS

Koo, J.H., et al., "Nanocomposites for Carbon Reinforced Polymer Matrix Composites," STTR Report, Oct. 26, 2004, 34 pages.

PCT International Search Report, PCT/US2011/039380 dated Feb. 9, 2012, 3 pages.

Cohen D. et al., "The Effect of Fiber Volume Fraction on Filament Wound Composite Pressure Vessel Strength," *Composites Part B: Engineering*, vol. 32, Issue 5 (2001) p. 413-429.

Mao, C.S. et al., "An Estimation of Strength for Composite Pressure Vessels," *Composite Structures*, vol. 22, Issue 3, (1992) p. 179-186.

Thesken, J.C., et al., "Composite Overwrap Pressure Vessels: Mechanics and Stress Rupture Lifing Philosophy," NASA-TM 2009-215683, Sep. 2009, p. 1-21.

van Krevelen, D. W., *Properties of Polymers: Their Correlations with Chemical Structure: Their Numerical Estimation and Prediction from Additive Group Contributions*, 3rd Ed., Chapter 7, "Cohesive Properties and Solubility," 1990, p. 189-225.

Xirrya, Zhang, Novel Process of Application and Surface-modification Technique for Nano-particles Materials, Oct. 2005, pp. 58-63.

Li-xin, Chen et al., Research Progress of Nanomaterials of Epoxy Resin Composite, Nov. 2002, p. 4-6.

Shuhui, Zhang et al., Effect of Nano-$SiO_2$ on Fiber Strength Transtation of Epoxy Composites Case, Fiber Composites, Jun. 2004, No. 2, pp. 8-11.

Qingjiang et al., Yunnan Chemical Technology, "Study on Mechanism of Compatibility of Blend System of Polymer PP/nano $CaCo_3$ Powder", Jun. 2006, vol. 33, No. 3.

Zhang et al., Novel Process of Application and Surface-modification Technique for Nano-particles Materials, Oct. 2005, pp. 58-63 (w/English Abstract).

Chen et al., Research Progress of Nanomaterials of Epoxy Resin Composite, Nov. 2002, p. 4-6 (w/English Abstract).

Shuhui, et al., Effect of Nano-$SiO_2$ on Fiber Strength Transtation of Epoxy Composites Case, Fiber Composites, Jun. 2004, No. 2, pp. 8-11 (w/English Abstract).

Chinese Search Report from Application No. 201180034874.3, dated Nov. 28, 2013, 3 pp.

* cited by examiner

COMPOSITE PRESSURE VESSELS

CROSS REFERENCE TO RELATED APPLICATION

This application claims the benefit of U.S. Provisional Patent Application No. 61/355,769, filed Jun. 17, 2010, the disclosure of which is incorporated by reference herein in its entirety.

FIELD

The present disclosure relates to pressure vessels, e.g., pipes and tanks, made using fiber composites. In particular, the present disclosure relates to pressure vessels formed of fiber composites containing fibers impregnated with a resin system comprising surface-modified nanoparticles dispersed in a matrix resin.

BACKGROUND

Generally, pressure vessels are structures capable of containing a fluid, e.g., liquids, liquefied gases, compressed gases, and combinations thereof, under pressure. Exemplary pressure vessels include storage containers (e.g., fuel tanks, portable gas (e.g., oxygen) storage bottles, and accumulators) as well as pipes and other conduits that may be used to transport fluids at elevated pressures (e.g., hydraulic lines) and structures exposed to transient elevated pressures (e.g., rocket motor casings and launch tubes).

Traditionally, pressure vessels were made of metal. While many factors affect material selection including thermal stability, corrosion resistance, and fatigue performance; decreasing the weight, improving the burst strength, and increasing the useful life have become significant factors for pressure vessel designers. These demands have led to an increased use of fiber-reinforced composites in the construction of pressure vessels. However, still greater reductions in weight and improvements in strength are desired.

SUMMARY

Briefly, in one aspect, the present disclosure provides a pressure vessel comprising a wall circumferentially enclosing an open volume capable of being filled with a fluid. The wall comprises an interior surface adjacent the open volume and an exterior surface opposite the interior surface, a first end, a second end, and an axial direction. The wall also comprises a composite layer comprising a resin system impregnated with fibers. The resin system comprises a curable matrix resin and a plurality of surface-modified nanoparticles.

In some embodiments, at least one composite layer comprises fibers aligned at angle of greater than 70 degrees relative to the axial direction. In some embodiments, at least one composite layer comprises fibers aligned at angle of no greater than 40 degrees relative to the axial direction. In some embodiments, at least one composite layer comprises fibers aligned at angle of between 40 and 70 degrees, inclusive, relative to the axial direction In some embodiments, the pressure vessel further comprises a first cap, and optionally, a second cap, extending from the wall adjacent the first end and second end, respectively, further enclosing the open volume. In some embodiments, a cross section of the wall perpendicular to the axial direction is elliptical. In some embodiments, the pressure vessel is ellipsoidal.

In some embodiments, the curable matrix resin comprises an epoxy. In some embodiments, at least some of the surface-modified nanoparticles comprise a core comprising at least one metal oxide, e.g., silica. In some embodiments, a surface-modifying agent covalently is bonded to the surface of the core. In some embodiments, at least some of the surface-modified nanoparticles comprise a core comprising calcite. In some embodiments, a surface-modifying agent is ionically associated with the core. In some embodiments, the resin system further comprises a rubber toughener. In some embodiments, the rubber toughener includes a core shell rubber.

In some embodiments, the wall further comprises a liner having an interior surface adjacent the open space and an exterior surface, wherein the composite layer is adjacent the exterior surface of the liner. In some embodiments, the liner comprises at least one a metal and a polymer.

In some embodiments, the open volume contains a fluid at an absolute pressure of at least 10 MPa. In some embodiments, the open volume contains a fluid at an absolute pressure of at least 30 MPa. In some embodiments, the open volume contains a fluid at an absolute pressure of at least 40 MPa. In some embodiments, the open volume contains a fluid at an absolute pressure of at least 50 MPa. In some embodiments, the open volume contains a fluid at an absolute pressure of at least 60 MPa. In some embodiments, the open volume contains a fluid at an absolute pressure of at least 70 MPa. In some embodiments, the open volume contains a fluid at an absolute pressure of at least 80 MPa. In some embodiments, the open volume contains a fluid at an absolute pressure of at least 90 MPa.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

Figure 1:
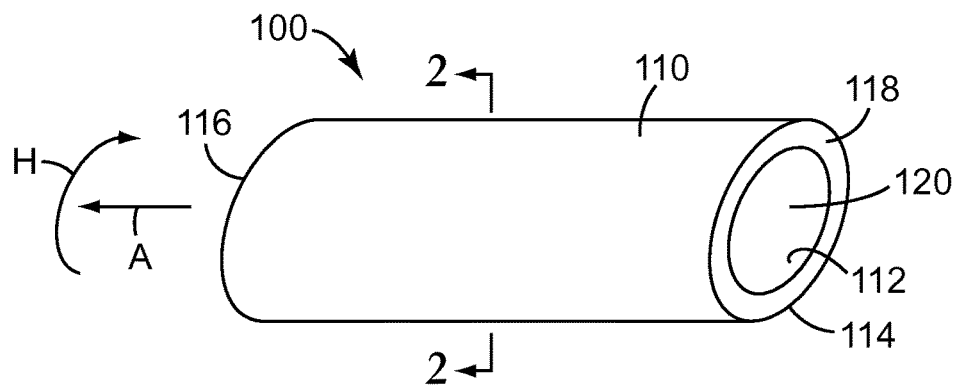
FIG. 1 illustrates an exemplary composite pressure vessel according to some embodiments of the present disclosure.

Generally, pressure vessels are classed into four categories based on the materials used for their construction:
- Type I: an all-metal construction (e.g., stainless steel);
- Type II: mostly metal with some fiber overwrap in the hoop direction;
- Type III: a metal liner with a full fiber composite overwrap;
- Type IV: a polymer liner with a full fiber composite overwrap.

In general, as a pressure vessel progresses from Type I to Type IV, the percentage of structural load carried by the fiber composite portion of the structure increases.

Generally, a fiber composite comprises fibers impregnated with a resin, often called a "matrix resin." Structural fibers include, for example, glass, aramid, and carbon fibers. Such fibers have stiffness and strength properties that are much higher than the resins used to impregnate them to form the composite. For pressure vessel applications, the fibers are in continuous form (that is, not chopped or otherwise discontinuous). The fibers are typically wound around a liner or mandrel such that the length direction of the fibers is aligned in the primary loading directions. This practice takes advantage of the excellent longitudinal stiffness and strength characteristics of structural fibers.

When designing a pressure vessel, the burst strength of the vessel, particularly the burst strength in the hoop direction (i.e., the hoop strength) is critical. When pressurized, the walls of a pressure vessel experience a multi-axial load and strain. For most common pressure vessel designs, the hoop load will exceed the axial load. For example, with a cylindrical pressure vessel, the hoop load will be twice the axial load; thus, the hoop strength will control the burst strength of the pressure vessel.

There have been numerous studies on the design considerations relevant to improving the burst strength of a pressure vessel. With respect to pressure vessels prepared from fiber composites, the hoop strain and burst strength have been correlated with the mechanical properties of the fiber. For example, netting analysis is often used to estimate stresses and to predict failure in a fiber composite. This approach excludes the effects of the resin entirely, focusing solely on the mechanical properties of the fibers, in particular the fiber strength.

The focus on fiber properties is primarily due to the substantially higher mechanical properties of the fibers relative to the resin. For example, carbon fibers having a tensile modulus of about 200 to about 550 GPa are available. In contrast, the tensile modulus of a typical matrix resin is one to two orders of magnitude smaller, e.g., the tensile modulus of polyester, epoxies, and cyanate esters is about 3 to 5 GPa. Because of the much greater stiffness of the fibers relative to the matrix resin, load in the fiber direction (i.e., the length direction of the fiber) is carried mostly by the fibers. Therefore the strength in the fiber direction is dominated by the fiber strength and best use of the high fiber strengths is achieved by orienting the fibers in the primary loading directions of composite pressure vessels.

Optimum design of composite pressure vessels requires efficient use of the constituent materials, especially the fiber. The cost, weight, and strength of a pressure vessel are all dominated by fiber utilization. Typically the fiber used is more expensive per weight than the resin constituent, as well as being of higher density. The density of glass fibers is about 2.1 gm/cc, and the density of carbon fibers is about 1.8 gm/cc. The densities of common matrix resins are lower, e.g., about 1.2 gm/cc for vinyl ester and epoxy resins, and about 1.4 gm/cc for polyester resins. Of course, there may be great variation in the densities of the materials depending on the particular product selected, but, generally, the density of the fibers is greater than that of the matrix resin. In addition, the time, and thus cost, required to fabricate a pressure vessel as well as weight of a design are reduced by reducing the amount of fiber that must be placed during fabrication. Optimum design for a pressure vessel, then, dictates achieving the required strength using the minimum amount of fiber.

In general, the tensile modulus of a unidirectional composite can be determined from the rule of mixtures, as shown in Equation 2:

$$E_{composite} = E_{fiber} \cdot V_{fiber} + E_{resin} \cdot (1 - V_{fiber}); \text{ wherein} \quad (2)$$

$E_{composite}$=tensile modulus of the fiber composite,
$E_{fiber}$=tensile modulus of the fiber,
$E_{resin}$=tensile modulus of the resin, and
$V_{fiber}$=volume fraction of the fibers relative to the total volume of the fibers and resin.

Rearranging Equation 2, and recognizing that the ratio of $E_{resin}$ over $E_{fiber}$ is typically less than 0.02 (i.e., 4 GPa for the resin divided by 200 GPa for the fiber), it is clear that, for any practical volume fraction of fibers (e.g., $V_{fiber}$>0.1) the composite modulus is dominated by the fiber modulus.

$$\frac{E_{Composite}}{E_{fiber}} = V_{fiber} \cdot \left(1 + \frac{E_{resin}}{E_{fiber}} \cdot \left(\frac{1 - V_{fiber}}{V_{fiber}}\right)\right). \quad (3)$$

The dominance of the fiber strength on pressure vessel burst strength without regard to the properties of the matrix resin is also acknowledged in the literature concerning pressure vessel design. For example, in a paper entitled "An estimation of strength for composite pressure vessels," (Composites Structures 22 (1992), pp. 179-186), Mao et al. propose a method for estimating the burst strength of a composite pressure vessel. In this work the statistical distribution of fiber strength and the statistical implications of using data from small volume laboratory specimens to predict large volume structural strength were treated without regard to the matrix resin properties. Statistical strength data derived from impregnated fiber strands and ring specimens were normalized to the fiber area fraction of the composites. Mao et al. stated that "Since the Young's modulus of fiber is much greater than that of matrix, the strength calculation in the equation assumed that all the load is carried by the fibers." The resulting analysis was found to be a feasible method for estimating the fracture strength of a composite pressure vessel.

Another reference that acknowledges the industry recognition of the dominance of the fiber properties on pressure vessel strength and negligible contribution of matrix properties is "Composite Overwrap Pressure Vessels: Mechanics and Stress Rupture Lifing Philosophy," NASA/TM-2009-215683, Thesken et al. It states, "Following common filament winding design practice, no strength nor stiffness is ascribed to the resin."

Contrary to prior experiments and models, as well as conventional wisdom, the present inventors have surprisingly discovered that the use of matrix resins containing surface modified nanoparticles can provide significant increases in burst strength without increasing the fiber content of a pressure vessel design. In some embodiments, this discovery could allow pressure vessel designers to increase strength without the significant weight penalty associated with increasing the amount of fiber used. In some embodiments, pressure vessel designers could also reduce the weight of a pressure vessel by eliminating composite layers while maintaining the desired strength.

Figure 2:
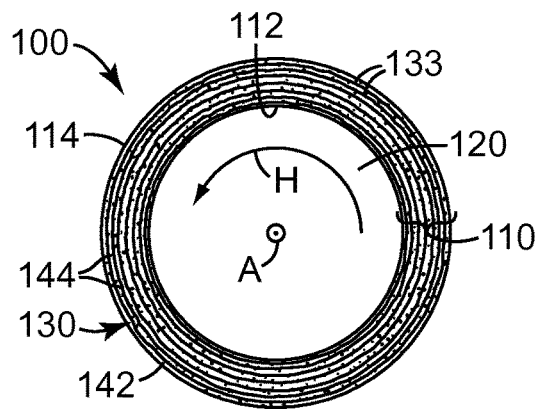
FIG. 2 illustrates a cross-section of the composite pressure vessel of FIG. 1.

An exemplary pressure vessel is shown in FIG. 1, and a cross-section of this pressure vessel is shown in FIG. 2. Pressure vessel 100 includes wall 110 circumferentially enclosing open volume 120. Open volume 120 can be filled with a fluid, e.g., a liquid or gas, under high pressure. Wall 110 comprises interior surface 112 adjacent open volume 120 and exterior surface 114 opposite interior surface 112. Wall 110 also includes first end 116, and second end 118.

As shown in FIG. 2, wall 110 includes fiber composite 130. Fiber composite 130 comprises fibers 133 aligned in the hoop direction, H. As used herein, and as shown in FIGS. 1 and 2, the hoop direction is defined relative to the axial direction, A. The hoop direction corresponds to the surface of the pressure vessel defined by a cross-section of the pressure vessel that is perpendicular to axial direction, A. The fibers are impregnated within a resin system that comprises a plurality of surface-modified nanoparticles 144 dispersed in matrix resin 142.

The pressure vessel of FIG. 2 is highly simplified compared to commercial pressure vessels. In general, the wall of a pressure vessel includes multiple plies of the same or different fiber composites. The angle of the fibers relative to the axial direction of the pressure vessel can be varied to meet various design considerations. In addition, a liner is often used to provide a desired interior wall surface for contact with the fluid and as a form for building up the desired number of composite layers.

Figure 3:
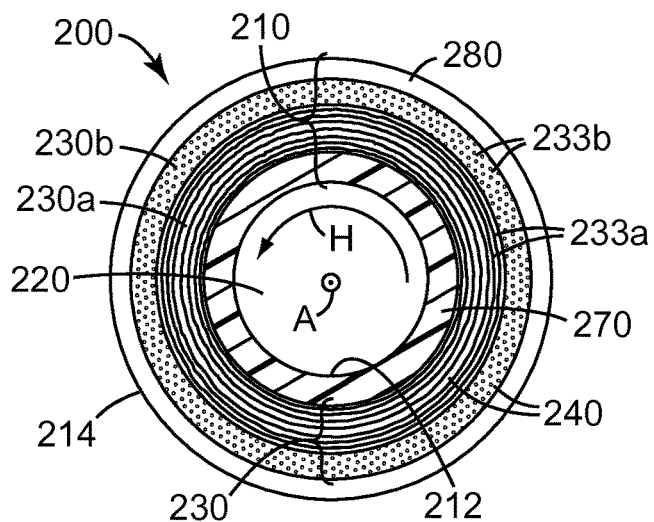
FIG. 3 illustrates a cross-section of another exemplary composite pressure vessel according to some embodiments of the present disclosure.

FIG. 3 illustrates a cross-section of exemplary pressure vessel 200, according to some embodiments of the present disclosure. Wall 210 includes multiple fiber composite layers 230 surrounding open volume 220. Each fiber composite layer 230 comprises fibers impregnated with resin system 240.

In some embodiments, for at least some of the fiber composite layers, e.g., fiber composite layer 230a, hoop fibers 233a are substantially aligned in hoop direction, H. Ideally, the hoop fibers would be aligned precisely in the hoop direction. However, the fibers are typically spirally wound as continuous tows (i.e., bundles) of fibers. Depending on the number of tows that are simultaneously, spirally wound, the fibers must be aligned at some angle less than 90 degrees relative to the axial direction to minimize overlap between adjacent wraps. In some embodiments, the hoop fibers are aligned at an angle greater than 70 degrees relative to the axial direction, in some embodiments, greater than 80 degrees, e.g., greater than 85 degrees, or even greater than 88 degrees, relative to the axial direction.

In some embodiments, one or more fiber composite layers, e.g., fiber composite layer 230b, include axial fibers 233b that are more closely aligned with the axial direction. In some embodiments, the axial fibers 233b may be helically wound. In some embodiments, the axial fibers are aligned at an angle of no greater than 40 degrees relative to the axial direction, in some embodiments, no greater than 30 degrees, e.g., no greater than 15 degrees, no greater than 10 degrees. In some embodiments, the axial fibers are aligned at an angle relative to the axial direction of between 3 and 15 degrees, inclusive, e.g., between 3 and 10 degrees, inclusive, or even between 5 and 10 degrees, inclusive.

In some embodiments, one or more fiber composite layers include fibers that are aligned at an angle of between 45 and 70 degrees, inclusive, e.g., between 50 to 60 degrees, inclusive, or even between 53 and 56 degrees relative to the axial direction. For example, when winding an idealized infinite cylinder, a winding angle of 54.7 degrees is used to achieve a 2:1 ratio of hoop strength to axial strength.

As shown in FIG. 3, in some embodiments, the wall comprises liner 270 in addition to the fiber composite layer. In some embodiments, the liner is comprised of a metal, e.g. aluminum, steel (e.g., stainless steel), titanium, or combinations thereof. In some embodiments, the liner is comprised of polymer, e.g., a polyolefin such as HDPE. Ceramic liners have also been used. In some embodiments, the liner itself may comprise multiple layers of the same or different materials. For example, coatings or films may be applied to provide, e.g., erosion resistance, corrosion resistance, and/or chemical resistance and diffusion resistance, including moisture and gas barriers. The interior surface of the liner, or of any optional layer applied to the interior surface of the liner, provides the interior surface 212 of wall 210.

Coatings or films may also be applied to the composite layers. For example, in some embodiments, optional layer 280 is located adjacent the outer surface of the composite layers and provides exterior surface 214 of wall 210. The composition of such an optional layer may be selected to provide any of a variety of desired attributes including, e.g., damage resistance, impact resistance, appearance, smoothness, erosion resistance, corrosion resistance, and/or chemical resistance. Such layers may also be provided as a barrier to constrain the fibers should failure of the composite layers occur.

The resin system for at least one fiber composite layer of the pressure vessels of the present disclosure comprises surface-modified nanoparticles dispersed in a matrix resin. In some embodiments, the resin system of at least 50%, e.g., at least 80%, e.g., at least 90%, or even all fiber composite layers comprising hoop aligned fibers comprise surface-modified nanoparticles dispersed in a matrix resin. In some embodiments, the resin system of at least 50%, e.g., at least 80%, e.g., at least 90%, or even all fiber composite layers (e.g., hoop aligned layers and axial aligned layers) comprise surface-modified nanoparticles dispersed in a matrix resin.

Although pressure vessels may have a wide variety of shapes, they are frequently cylindrical or spherical to maximize volume per unit surface area, and to avoid areas of stress concentration. In FIG. 1, a pressure vessel having two open ends was illustrated. As both ends 116 and 118 are open or unsealed, fluid can be pumped through open volume 120, under a pressure constrained by wall 110.

Figure 4:
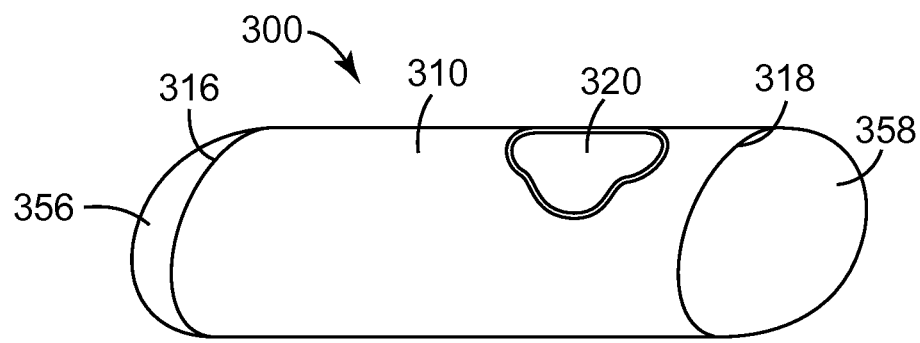
FIG. 4 illustrates an exemplary cylindrical composite pressure vessel according to some embodiments of the present disclosure.
Figure 5:
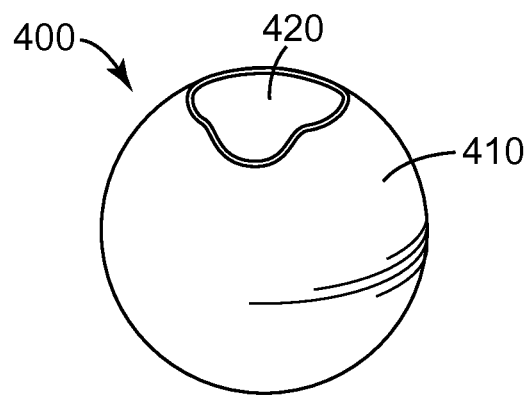
FIG. 5 illustrates an exemplary spherical composite pressure vessel according to some embodiments of the present disclosure

Generally, the shape and cross-section of a pressure vessel can be selected according to known design considerations. Pressure vessels having a wall with an elliptical, e.g., circular cross-section perpendicular to the axial direction are common. Such pressure vessels may include one or more caps sealing the ends of the elliptical wall. In addition, ellipsoidal, e.g., spherical, pressure vessels are also known. FIGS. 4 and 5 illustrate several other exemplary pressure vessels according to some embodiments of the present disclosure.

FIG. 4 shows cylindrical pressure vessel 300, which includes cylindrical wall 310 surrounding open volume 320. Pressure vessel 310 also includes first cap 356 adjacent first end 316 and second cap 358 adjacent second end 318. Caps, also called "heads" are used to constrain the fluid within the pressure vessel. The first cap and second cap provide a seal at the ends of wall 310, allowing the resulting enclosed vessel to be pressurized. In some embodiments, a cap may be integral to the end of the wall. In some embodiments, a cap may be attached, e.g., removably attached, to the end of a wall. The method of attaching, e.g., welds, adhesives, and the like, will depend on the materials of construction and other well-understood design parameters.

Although shown as hemispheres, any desired cap shape may be used. For example, in some embodiments, semi-elliptical shaped caps may be used. Although FIG. 4 shows a pressure vessel having a cap on both ends, pressure vessels having a cap on only one end are also possible.

Spherical pressure vessel 400 is shown in FIG. 5. Here, spherical wall 410 encloses open spaces 420. Generally, all other factors being equal, a spherical pressure vessel requires the least mass to provide a desired volume and maximum internal pressure.

Although not shown, cylindrical pressure vessel 310 and spherical pressure vessel 410 would typically include one or more sealable openings, e.g., valves or threaded fittings, to allow fluid to be introduced into the open space. In addition, these same openings, or other openings would be present to allow the discharge of fluid from within the pressure vessel.

Generally, the fiber composites of the present disclosure comprise fibers impregnated with a resin system. The resin system comprises surface-modified nanoparticles dispersed in a curable resin.

Generally, any fibers suitable for use in fibrous composites may be used. Exemplary fibers include carbon fibers, glass fibers, ceramic fibers, boron fibers, silicon carbide fibers, polyimide fibers, polyamide fibers, and polyethylene fibers. Combinations of materials may also be used. Generally, one or more layers of fiber composite incorporate the fibers as a unidirectional array of individual or bundled continuous fibers, e.g., a tow of fibers. However, woven fabric, knitted fabric, yarn, roving, braided constructions and non-woven mats of fibers may also be used for some layers.

Generally, any known curable resin or combination of resins may be used. In some embodiments, thermosetting resins and radiation-curable (e.g., ultraviolet light-cured or electron beam-cured) resins may be used. Suitable resins include, e.g., epoxy resins, polyester resins, bismalimides resins, cyanate ester resins, vinyl ester resins, acrylic resins, urethane resins, and urethane acrylate resins. In some embodiments, polyepoxide resins, including aliphatic and aromatic polyepoxide resins, may be used. Exemplary epoxy resins include those based on bisphenol A and bisphenol F, e.g., those available under the trade designation "EPON" from Momentive, Columbus, Ohio (formerly Hexion Specialty Chemicals, Inc., Columbus, Ohio). Other exemplary epoxy resins include low viscosity epoxies, such as those available under the trade designation "HELOXY" from Momentive.

Generally, the surface modified nanoparticles comprise an inorganic core with one or more surface-modifying agents bonded to the surface of the core. In some embodiments, the core comprises a metal oxide. Any known metal oxide may be used. Exemplary metal oxides include silica, titania, alumina, zirconia, vanadia, chromia, antimony oxide, tin oxide, zinc oxide, ceria, and mixtures thereof. In some embodiments, the core comprises an oxide of one metal deposited on an oxide of another metal. In some embodiments, the core comprises a metal oxide deposited on a non-metal oxide.

In some embodiments, the core comprises a carbonate, e.g., calcite. Calcite is the crystalline form of calcium carbonate and typically forms rhombohedral crystals.

In some embodiments, the cores have a primary particle size of between about 5 nanometers to about 500 nanometers, and in some embodiments from about 5 nanometers to about 250 nanometers, and even in some embodiments from about 50 nanometers to about 200 nanometers. In some embodiments, the cores have an average diameter of at least about 5 nanometers, in some embodiments, at least about 10 nanometers, at least about 25 nanometers, at least about 50 nanometers, and in some embodiments, at least about 75 nanometers. In some embodiments the cores have an average diameter of no greater than about 500 nanometers, no greater than about 250 nanometers, and in some embodiments no greater than about 150 nanometers. Particle size measurements can be based on, e.g., transmission electron microscopy (TEM).

In some embodiments, it may be desirable to control, e.g., minimize or even eliminate, filtering of the nanoparticles by the fibers during wetting or impregnation of the fibers with the resin system. Larger particles or particle aggregates may be filtered or separated from the resin system while the fibers are saturated with the resin system in the process of making a continuous fiber composite. This can result in a non-uniform distribution of particles and resin throughout the final composite resulting in decreased physical properties and the generation of flaw sites for stress concentration. In some embodiments, at least 70%, e.g., at least 75% of the nanoparticle cores have an average size of less than 400 nm. In some embodiments, at least 90%, in some embodiments, at least 95%, or even at least 98% of the cores have an average size of less than 400 nm, e.g., less than 200 nm, or even less than 100 nm.

In addition to the core, the nanoparticles of the present disclosure are surface-modified, i.e., a surface modifying agent is bonded to the surface of the core.

Generally, the surface-modifying agents of the present disclosure include at least a binding group and a compatiblizing segment:

Comp. Seg.—Binding Group;

wherein "Comp. Seg." refers to the compatiblizing segment of the surface-modifying agent.

The compatiblizing segment is selected to improve the compatibility of the nanoparticles with the curable resin. Generally, the selection of the compatiblizing group depends on a number of factors including the nature of the curable resin, the concentration of the nanoparticles, and the desired degree of compatibility. When using calcite nanoparticles, useful compatiblizing agents include polyalkylene oxides, e.g., polypropylene oxide, polyethylene oxide, and combinations thereof. When using silica nanoparticles, typical compatiblizing agents include saturated and unsaturated, aromatic or aliphatic hydrocarbons; polyalkane oxides; and combinations thereof.

In some embodiments, the compatiblizing segment may be selected to provide a positive enthalpy of mixing for the composition containing the surface-modified nanoparticles and the curable resin. If the enthalpy of mixing is positive, the dispersion of nanoparticles in the resin is typically stable. To ensure a positive enthalpy of mixing, the solubility parameter of the compatiblizing segment can be matched to the solubility parameter of the curable resin. In some embodiments, the materials can be selected such that the difference in these solubility parameters is no more than 4 $J^{1/2}$ $cm^{-3/2}$ and, in some embodiments, no more than 2 $J^{1/2}$ $cm^{-3/2}$ as determined according to *Properties of Polymers; Their Correlation with Chemical Structure; Their Numerical Estimation and Prediction from Additive Group Contributions*, third edition, edited by D. W. Van Krevelen, Elsevier Science Publishers B.V., Chapter 7, 189-225 (1990)), i.e., the "Solubility Parameter Procedure."

There are several methods known to determine the solubility parameter of a material such as a compatiblizing segment or a resin. For example, the solubility parameter of the material can be determined from measurements of the extent of equilibrium swelling of the material in a range of solvents of differing solubility parameters. The solubility parameters of the solvents themselves can be determined from their heats of evaporation. The solubility parameter delta ($\delta$) is related to the cohesive energy $E_{coh}$ and the specific volume V by the relationship $\delta = (E_{coh}/V)^{1/2}$. For solvents of low molecular weight, the cohesive energy is closely related to the molar heat of evaporation $\Delta H_{vap}$ according to $E_{coh}=\Delta H_{vap}-p\Delta V=\Delta H_{vap}-RT$. Thus, $E_{coh}$ and $\delta$ can be calculated from the heat of evaporation of the solvent or from the course of the vapor pressure as a function of temperature. To determine the solubility parameter of the material, a plot of equilibrium swelling of the material versus the solubility parameter of the solvents is generated. The solubility parameter of the material is defined as the point on this plot where maximum swelling is obtained. Swelling will be less for solvents having solubility parameters that are less than or greater than that of the material. Alternatively, there are several known methods for theoretically estimating the solubility parameter of a material based on the additive contributions of functional groups.

The binding group bonds to the surface of the core, connecting the surface-modifying agent to the core. In some embodiments, the surface-modifying agents are covalently bonded to the core. This is typical when the core is silica. In some embodiments, the surface-modifying agents are ionically bonded to (e.g., associated with) the core. This is typical for calcite cores.

In order to retain ionically bonded surface-modifying agents with the cores during processing of the compositions, it may be desirable to select binding groups having high bond energies to core. Bond energies can be predicted using density functional theory calculations. In some embodiments, the calculated bond energies may be at least 0.6, e.g., at least 0.7 electron volts. Generally, the greater the bond energy the greater the likelihood that the binding group will remain ionically associated with the particle surface. In some embodiments, bond energies of at least 0.8, e.g., at least 0.9, or even at least 0.95 electron volts, may be useful.

In some embodiments, the binding group comprises a phosphonic acid, e.g., surface-functionalizing agents having a formula:

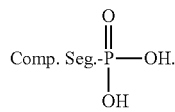

In some embodiments, the binding group comprises a sulfonic acid, e.g., surface-functionalizing agents having a formula:

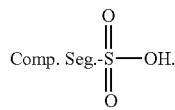

In some embodiments, the surface-modifying agent also comprises a reactive group, i.e., a group capable of reacting with the curable resin, e.g., during the curing process. This can result in the nanoparticles being strongly bonded into the resin matrix and may lead to an improvement in the physical properties of the resulting cured nanocomposite. Generally, the reactive group is selected based on the nature of the curable resin. In some embodiments, the reactive group may be located on the end of the compatiblizing segment:

Rx. Group—Comp. Seg.—Binding Group;

wherein "Rx. Group" is the reactive group. In some embodiments, the reactive group may be located along the backbone of or pendant to the backbone of the compatiblizing segment. In some embodiments, the reactive group may be located between the compatiblizing segment and the binding group:

Comp. Seg.—Rx. Group—Binding Group.

In some embodiments, a linking group is present connecting the compatiblizing segment with the binding group:

Comp. Seg.—Linking Group—Binding Group.

The compositions of the present disclosure may be cured. In some embodiments, the curable resin is crosslinked. Any known crosslinking method may be used including exposure to thermal energy or actinic radiation (e.g., ultraviolet light and electron beam radiation). In some embodiments, the curable resin may also react with the surface-modifying agent. For example, in some embodiments, a reactive group of the surface-modifying agent may react with, e.g., covalently bond with, the curable resin.

In some embodiments, the compositions of the present disclosure may include additional additives such as curing agents, cure accelerators, catalysts, crosslinking agents, dyes, pigments, flame retardants, impact modifiers, and flow control agents.

In some embodiments, the compositions may include tougheners, e.g., rubber tougheners. Exemplary rubber tougheners include coreshell rubbers and self-assembling block copolymers. In some embodiments, nano-sized coreshell rubber tougheners may be used, i.e., coreshell rubber tougheners having an average size of less than 1 micron. In some embodiments, the nano-sized coreshell rubber tougheners have an average size of less than 500 nm, less than 250 nm, or even less than 100 nm. Exemplary nano-scale coreshell rubber tougheners are available from, e.g., Kaneka Texas Corporation including those available under the trade name "KANE ACE." In some embodiments, phase separating rubbers such as carboxyl-terminated butadiene-acrylonitrile (CTBN) rubber may also be used.

In some embodiments, micron-sized coreshell rubber tougheners may be used, i.e., coreshell rubber tougheners having an average size of greater than 1 micron, e.g., 1 to 10 microns. Exemplary micron-scale coreshell rubber tougheners are available from, e.g., Rohm & Haas including those available under the trade name "PARALOID."

In some embodiments, rubber domains can be created through the addition of self-assembling block copolymers. Exemplary self-assembling block copolymers are available from, e.g., Arkema, INC., including those available under the trade name "NANOSTRENGTH."

Generally, the compositions of the present disclosure may be used to form fibrous composites. For example, in some embodiments, reinforcing fibers may be impregnated with the composition to form a composite pressure vessel. The resin may then be cured using any known means including exposure to thermal energy and/or actinic radiation.

Any known method of producing a pressure vessel may be used. Exemplary methods include wet filament winding in which the fiber tows are impregnated with the resin system prior to their application to liner and dry filament winding in which the fiber tows are first applied to the liner and subsequently impregnated with resin. Braiding may also be used to form the composite pressure vessel. Braiding or winding with "towpreg" is also known for the manufacture of pressure vessels. Towpreg consists of fiber bundles (e.g., tows) pre-impregnated with a resin system. This towpreg can be applied without any additional wet resin, and can be cured directly after application.

EXAMPLES

Test Methods

Gas Chromatography (GC) Procedure. Gas chromatography was run using a gas chromatograph commercially available under the trade designation "AGILENT 6890N" equipped with a HP 7683 injector, and an HP-5 column ((5% phenyl)-methylpolysiloxane having a length of 30 meters and an inside diameter of 320 micrometers (available from Agilent Technologies, Incorporated, Santa Clara, Calif.)). The following parameters were employed: a 1 microliter aliquot of a 10% sample solution (in GC grade Acetone) was injected; split inlet mode was set at 250° C., 65.6 kPa (9.52 psi) and a total flow of 111 mL/min; column constant pressure mode set at 65.6 kPa (9.52 psi); velocity was set at 34 centimeters/second; gas flow was 2.1 mL/min; detector and injector temperatures were 250° C.; and a temperature sequence of equilibration at 40° C. for 5 minutes followed by a ramp rate of 20° C./minute to 260° C.

Thermogravimetric Analysis (TGA) Procedure. To determine the solids content of the nanoparticle epoxy product, a sample of approximately 20 mg of the product was placed into a platinum TGA pan. The pan was loaded into a TGA (Q500, TA Instruments, Inc., New Castle, Del.) and ramped from 30° C. to 900° C. at a rate of 20° C./minute in an air purge gas.

In the case of a sample containing silica nanoparticles, the weight of sample (as a percentage of initial weight) remaining at 850° C. was taken as the weight percent of incombustible material and is reported as the weight percent of the product that is silica solids. In the case of a sample containing calcite nanoparticles, the residual weight was assumed to be the CaO remaining in the sample after volatilizing all organics and carbon dioxide from the calcite at 900° C. The calcite weight percent in the original sample was then calculated by dividing the weight percent CaO residue by 0.56.

Particle Size Procedure. The nanoparticle dispersion was diluted to approximately 1% solids with acetone. The sample was then added to the measurement cell, which was filled with acetone, until the transmittance was between the recommended levels of 85% to 95%. The particle size of the nanoparticles was measured by laser diffraction using an analyzer commercially available under the trade designation "HORIBA LA-950" from Horiba, Ltd. Corporation, Kyoto, Japan. The optical model for the calculation used a refractive index of 1.6000 for calcite and 1.3591 for the solvent acetone. The second differential method was used for smoothing and was based on 150 iterations.

Comparative Example 1 (CE-1)

Pressure vessel articles for Comparative Example 1 were made by combining 1.111 parts by weight EPON 828 epoxy resin (obtained from Hexion Specialty Chemicals, Inc., Columbus, Ohio) and 1.00 parts by weight of liquid anhydride curative with promoter, such as that commercially available under the trade designation "LINDRIDE 36Y" from Lindau Chemicals Inc., Columbia, S.C., in a plastic container. The two resins were mixed by hand with a wooden stir stick until well mixed (approximately 1-2 minutes). This resin and curative mixture was used to make three individual pressure vessels for CE-1.

Example 1 (EX-1)

A fiber composite comprising a resin system containing surface-modified silica nanoparticles was prepared as follows. Surface-modified silica (SMS) nanoparticles were prepared by adding 0.73 parts by weight NALCO 2327 silica (41.1 wt % silica in an aqueous dispersion from Nalco Chemicals, Naperville, Ill., lot BP9J1622A4) to a jar along with a magnetic stir-bar. The jar was placed on a stir plate and the solution was stirred to create a 2 to 5 cm vortex. Next 1.00 parts by weight methoxy propanol were mixed with 0.03674 parts by weight trimethoxyphenyl silane (Gelest Inc., Morrisville, Pa., lot number 1B-15944). The resulting methoxypropanol mixture was poured slowly into the jar containing the silica while the mixture was agitated with the magnetic stir-bar. The jar was sealed and placed into a batch oven at 80° C. for 16 hours. The resulting sample, identified as "SMS-1," contained 16.9 wt % silica.

Surface-modified silica nanoparticles were prepared by charging 1.69 parts by weight of silica sol (NALCO 2329K, 40.7 wt % in an aqueous dispersion, lot BP9A1739A0) to an open head stainless steel mixing vessel. Next, 1.00 part by weight methoxy propanol was added slowly while agitating, and then 0.0225 parts by weight of trimethoxy phenyl silane (Gelest Inc., lot 1B-15944) was slowly added to the mixture. The mixture was allowed to agitate with a pneumatically-driven impeller for 30 minutes.

A continuous flow hydrothermal reactor, such as that described in PCT Publication number WO2009/120846 A2, was used to provide successful surface functionalization of the silica nanoparticles. The 27 liter reactor consisted of 18.3 meters of 1.27 cm outer diameter (OD) (1.09 cm inner diameter (ID)) stainless steel tubing, followed by 12.2 meters of 0.95 cm OD (0.77 cm ID) stainless steel tubing, followed by 198.1 meters of 1.27 cm ID polytetrafluoroethylene (PTFE) smooth bore inner tube with a high strength 304 stainless steel braided exterior). The oil temperature in the hydrothermal reactor was maintained at 155° C., and the backpressure regulator (TESCOM, Elk River, Minn.) was maintained at a gage pressure of 2.14 MPa. A diaphragm pump (LDC1 Ecoflow, American Lewa, Holliston, Mass.) was used to control the flowrate at 760 ml/min through the reactor, resulting in a residence time of 35 minutes. The effluent from the continuous flow hydrothermal reactor was collected in an HDPE drum, and is identified as SMS-2.

Preparation of nanoparticle epoxy product. The following materials were added to a 380 liter kettle with agitation forming a feed mixture: 0.92 parts by weight of SMS-1, 5.39 parts by weight of SMS-2, 1 part by weight methoxy propanol, 1.07 parts by weight epoxy resin (EPON 828), and 0.27 parts by weight a diglycidyl ether of cyclohexane dimethanol (HELOXY 107) and mixing well. The kettle was kept at 25° C. and the components were agitated for a minimum of 14 hours. The mixture was metered to the top entrance of a Wiped Film Evaporator (WFE) as described in International Patent Application Number PCT/US10/35924 ("Process for Making Filled Resins", filed 24 May 2010), i.e., a one square meter WFE counter current polymer processing machine, using a BLB series rotary external spur gear, and a chemical duty gear pump (BUSS FILMTRUDER, Zenith Pumps, Sanford, N.C.). The WFE rotor (a BUSS Filmtruder-type) was set at a speed of 340 rpm with a 25 Horsepower drive. Vacuum was applied at a level of 2.5 to 2.8 kPa. The feed mixture was subject to the conditions shown in Table 1. After approximately 15 minutes of operation, the product effluent was isolated as a solvent-free, bluish-white, fluid liquid material.

TABLE 1

| | | WFE process conditions | | | |
|---|---|---|---|---|---|
| | Feed | Vacuum | Temperature (° C.) | | | |
| Ex. | (kg/hr) | (kPa) | Zone 1 | Zone 2 | Zone 3 | Zone 4 |
| EX-1 | 68 | 2.6 | 108 | 108 | 150 | 148 |

As the resulting resin system containing surface-modified nanoparticles dispersed in epoxy resin cooled, it thickened to a sticky, liquid resin which was analyzed by Thermogravimetric Analysis (TGA) Procedure and Gas Chromatography (GC) Procedure. TGA results showed silica solids to be 52.2 wt % in the resin system. Analysis of residual solvent by GC showed less than 0.05 wt % methoxy propanol and no detectable amount of water remaining in the resin system.

Preparation of diluted nanoparticle epoxy product. The resin system was diluted by combining 22.56 parts by weight of the resin system with 1.00 part by weight of epoxy resin (EPON 828) and 0.25 parts by weight of a diglycidyl ether of cyclohexane dimethanol (HELOXY 107). The TGA analysis on the resulting well-mixed sample showed silica solids to be 49.5 wt % in the diluted nanoparticle epoxy product.

Preparation of the resin and curative mixture used to make pressure vessels. Into a plastic bucket, 2.24 parts by weight of the diluted nanoparticle epoxy product were measured along with 1.00 parts by weight of a liquid anhydride curative with promoter (LINDRIDE 36Y). The resins were mixed by hand with a wooden stir stick until well mixed (approximately 3 minutes). This resin system and curative mixture was used to make the three individual pressure vessels for Example-1.

Example 2 (EX-2)

A fiber composite comprising a resin system containing surface-modified calcite nanoparticles was prepared as follows. First, 18,015 grams of calcite (SOCAL 31); 9,608 grams of epoxy resin (EPON 828); 2,402 grams of a diglycidyl ether of cyclohexane dimethanol (HELOXY 107); 1,352 grams of JAS ligand; and 5,500 grams of methyl ethyl ketone (MEK) were premixed with a disperser equipped with an f-blade (BYK-Gardner, Columbia, Md., USA). The JAS was preheated to 90° C. to reduce its viscosity for ease of handling.

The structure of the JAS ligand is:

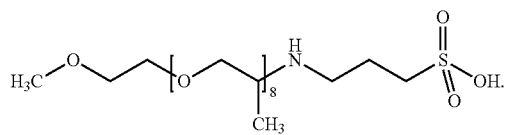

The JAS ligand can be prepared as described of Ligand V in International Patent Application PCT/US2009/068359 ("Nanocalcite Composites", filed 17 Dec. 2009).

Milling of the premix was then performed with a LME-4 horizontal mill (NETZCH Fine Particle Technology, Exton, Pa., USA) equipped with a stainless steel chamber and agitator, using a Mollinex configuration. 1-methoxy-2-propanol was used as the sealing fluid. The milling media was 0.5 mm yittrium-stabilized zirconia. Media loading was 85% of milling chamber volume. Two batches of the composition given above were milled. The first was milled for 1 hour and 45 minutes and the second for 2 hours and 30 minutes. Both milled batches had identical mean particle size of 265 nm and a single particle size distribution peak as measured according to the Particle Size Procedure.

The two milled batches were then loaded into a 10 gallon stainless steel kettle for stripping of the MEK. The temperature of the batch was increased incrementally over a five-hour period until a nominal batch temperature of 100° C. was reached. An aspirator was used for vacuum and achieved a nominal vacuum of 88 kPa. Once a nominal batch temperature of 100° C. was reached, the vacuum source was switched from the aspirator to a vacuum pump for 15 minutes while maintaining the 100° C. nominal batch temperature. The vacuum pump achieved a nominal vacuum of 91 kPa. The contents of the kettle were then drained.

Next, 26,136 grams of the kettle contents prepared as described above were combined with 2,927 grams coreshell rubber particles in resin commercially available under the trade designation "KANE ACE MX-257" from Kaneka Texas Corporation, Pasadena, Calif.; 755.1 grams of diglycidyl ether of cyclohexane dimethanol (HELOXY 107); and 1,176.12 grams epoxy resin (EPON 828) and mixed with a cowels blade until homogeneous. Finally, 2,721.6 grams of this nanocalcite formulated resin were combined with 1,143.1 grams of a liquid anhydride curative with promoter (LINDRIDE 36Y).

Preparation of pressure vessel articles. Composite Overwrapped Pressure Vessels (COPV) were fabricated at the HyPerComp Engineering, Inc. facility (Brigham City, Utah) utilizing a four programmable axis filament winder commercially available from ENTEC Composite Machines, Salt Lake City, Utah. The fiber path consisted of six nylon rollers prior to the resin bath with two steel bars and two ceramic eyelets after the resin bath.

The pressure vessels were prepared by winding carbon fiber (TORAY T700SC-12000-50C, Lot #A2106M2, Toray Carbon Fibers America, Inc., Decatur, Ala.) saturated in the epoxy resin system of Example 1, Example 2, or Comparative Example 1 about an aluminum liner (7.5 L capacity 6061 T6 Aluminum standard test article liner). The coating process consisted of passing the four tows of fiber across a drum which rotates through a pan of the resin system. The excess resin system was scraped from the drum using a metering blade prior to contacting the fibers. The fibers became saturated with the resin system through the contact with the wet drum and then passed on to the filament winder where they were applied to the aluminum liner.

Each vessel was wound with a pattern of 6 hoop layers and 2 helical layers. The winding pattern speeds are listed in Table 2. The hoop speed of Example 2 was reduced relative to the hoop speeds of Example 1 and Comparative Example 1. In addition, the temperature of the resin system of Examples 1 and 2 were increased to 27 to 32° C. relative the ambient conditions (i.e., 21 to 24° C.) used for Comparative Example 1. These changes were made to provide the desired resin/curative system transfer to the fibers during the coating process.

TABLE 2

| | Winding Pattern and Speed | | |
|---|---|---|---|
| Ex. | Winding pattern | Machine Speed (%) | Resin Temp. (° C.) |
| CE-1 | Hoop | 30 | 21-24° C. |
| | Helical | 70 | 21-24° C. |

TABLE 2-continued

Winding Pattern and Speed

| Ex. | Winding pattern | Machine Speed (%) | Resin Temp. (° C.) |
|---|---|---|---|
| EX-1 | Hoop | 30 | 27-32° C. |
|  | Helical | 70 | 27-32° C. |
| EX-2 | Hoop | 20 | 27-32° C. |
|  | Helical | 70 | 27-32° C. |

All vessels were cured together in a single oven according to the following protocol: held at 63° C. for 3 hours, temperature increased at about 3° C./min to 91° C. and held at 91° C. for 2 hours; temperature decreased at about 3° C./min to 85° C. and held at 85° C. for 6 hours. The weight and diameter of each aluminum liner was recorded before the filament winding process and again after the winding and curing steps. The results are summarized in Table 3.

TABLE 3

Aluminum liner weight and diameter, and fiber composite cured pressure vessel weight and diameter.

| Example | Cylinder Number | Liner Wt (kg) | Post-Cure Wt (kg) | Liner Diameter (cm) | Post-Cure Vessel Diameter (cm) |
|---|---|---|---|---|---|
| CE-1 | 1 | 2.173 | 2.773 | 15.939 | 16.368 |
| CE-1 | 2 | 2.173 | 2.764 | 15.939 | 16.373 |
| CE-1 | 3 | 2.173 | 2.782 | 15.939 | 16.398 |
| EX-1 | 1 | 2.164 | 2.891 | 15.939 | 16.447 |
| EX-1 | 2 | 2.164 | 2.909 | 15.951 | 16.452 |
| EX-1 | 3 | 2.173 | 2.927 | 15.951 | 16.454 |
| EX-2 | 1 | 2.173 | 2.909 | 15.951 | 16.436 |
| EX-2 | 2 | 2.164 | 2.891 | 15.939 | 16.424 |
| EX-2 | 3 | 2.173 | 2.918 | 15.951 | 16.419 |

Pressure vessel testing. All vessels were hydroburst tested on the same day using the same test set-up. The cured pressure vessels were filled with tap water and allowed to stand for 10 to 90 minutes while testing ensued. A high pressure fitting was used to connect each pressure vessel individually to a high pressure water pump and setup instrumented to record pressure at a frequency of 100 Hz. Water was added to the pressure vessels such that the pressure increased to 40-48 MPa (6000-7000 psi) in a span of 60-90 seconds.

The burst pressure was reported as the maximum pressure experienced by the vessel just prior to failure (indicated by a dramatic decrease in pressure). A finite element analysis was performed on the vessels using a non-linear analysis with finite element analysis software, such as "ALGOR FEA" software available from Autodesk, San Rafael, Calif. The results of the burst test and the calculation of total delivered fiber strength, as well as the coefficient of variation are reported in Table 4. As shown, the resin systems containing surface modified nanoparticles provided a dramatic 7% increase in average delivered fiber strength relative to the control sample fiber strength.

TABLE 4

Hydroburst test results.

| Ex. Num. | Cyl. Num. | Delivered Fiber Strength (MPa) | Average Delivered Fiber Strength (MPa) | Coefficient of Variation (%) | % of Control Sample Fiber Strength |
|---|---|---|---|---|---|
| CE-1 | 1 | 4981 | 5018 | 2.3 | 100 |
| CE-1 | 2 | 4925 |  |  |  |
| CE-1 | 3 | 5147 |  |  |  |
| Ex-1 | 1 | 5441 | 5368 | 1.2 | 107 |
| Ex-1 | 2 | 5350 |  |  |  |
| Ex-1 | 3 | 5314 |  |  |  |
| Ex-2 | 1 | 5435 | 5369 | 1.5 | 107 |
| Ex-2 | 2 | 5391 |  |  |  |
| Ex-2 | 3 | 5282 |  |  |  |

In a paper entitled "The effect of fiber volume fraction on filament wound composite pressure vessels," (Composites: Part B 32 (2001), pp. 413-429), Cohen et al., using fiber strain to failure data, reported how a 10% increase in composite fiber strength could be achieved by increasing the fiber volume fraction from 50 to 65%. However, Cohen et al. also noted that manufacturing composites with such a high volume fraction is not a trivial matter.

In contrast, the present inventors have discovered that a 7% increase in composite fiber strength from hydroburst testing can be achieved without increasing the fiber volume fraction. Contrary to the conventional approach of ignoring the matrix properties, the present inventors discovered that a significant improvement in composite fiber strength could be achieved by incorporating surface-modified nanoparticles in the matrix resin.

Comparative Example 2 (CE-2)

Pressure vessel articles for Comparative Example 2 were made in an identical manner to those for Comparative Example 1, except that 5 vessels were prepared, and they were filament wound and cured in two separate batches.

Example 3 (EX-3)

A fiber composite comprising a resin system containing surface-modified silica nanoparticles was prepared as follows. Surface-modified silica nanoparticles were prepared by charging 1.69 parts by weight of a silica sol (NALCO 2329K, 40.87 wt % silica in an aqueous dispersion, lot BPOD1847A0) to an open head stainless steel mixing vessel. Next, 1.00 parts by weight methoxy propanol was added slowly while agitating, and then 0.0197 parts by weight of trimethoxy phenyl silane was slowly added to the mixture. The mixture was allowed to agitate with a pneumatically-driven impeller for 30 minutes.

The same continuous flow hydrothermal reactor and reaction conditions described to make SMS-2 were used to prepare SMS-3. The effluent from the hydrothermal reactor was identified as SMS-3.

Surface-modified silica nanoparticles were prepared by charging 0.73 parts by silica sol (NALCO 2327, 41.1 wt % silica in an aqueous dispersion, lot BP9J1622A4) to an open head stainless steel mixing vessel. Next, 1.00 parts by weight of methoxy propanol was added slowly while agitating, and then 0.0237 parts by weight of trimethoxy phenyl silane was slowly added to the mixture. The mixture was allowed to agitate with a pneumatically-driven impeller for 30 minutes.

The same continuous flow hydrothermal reactor and reaction conditions described to make SMS-2 was used to prepare SMS-4 except that the TESCOM backpressure gage was maintained at a gage pressure of 2.21 MPa, and the residence time was 35.5 minutes. The effluent from the hydrothermal reactor was identified as SMS-4.

A nanoparticle epoxy product was prepared in the same manner as that of EX-1, except the following materials were added to the 380 liter kettle with agitation to form the feed mixture: 5.36 parts by weight SMS-3, 0.88 parts by weight of SMS-4, 1 part by weight methoxy propanol, 1.24 parts by weight epoxy resin (EPON 826), and 0.31 parts by weight a diglycidyl ether of cyclohexane dimethanol (HELOXY 107). This feed mixture was subject to the conditions shown in Table 5.

TABLE 5

WFE process conditions for EX-3, EX-4, and EX-5

| Ex. | Feed (kg/hr) | Vacuum (kPa) | Temperature (° C.) | | | |
|---|---|---|---|---|---|---|
| | | | Zone 1 | Zone 2 | Zone 3 | Zone 4 |
| EX-3 | 65.9 | 2.7 | 108 | 108 | 150 | 134 |
| EX-4 | 86.4 | 2.7 | 108 | 108 | 150 | 134 |
| EX-5 | 60.5 | 2.1 | 108 | 108 | 150 | 125 |

As the resulting resin system containing surface modified nanoparticles dispersed in epoxy resin cooled, it thickened to a sticky, liquid resin which was analyzed by TGA and GC. The TGA results showed the silica solids to be 48.54 wt % in the resin system. Analysis of residual solvent by GC showed no detectable amounts of methoxy propanol and no detectable amount of water left in the resin system.

Preparation of the resin and curative mixture used to make pressure vessels. Into a plastic bucket, 2.03 parts by weight of the nanoparticle epoxy product were measured along with 1.00 parts by weight of a liquid anhydride curative with promoter (LINDRIDE 36Y). The resins were mixed by hand with a wooden stir stick until well mixed (approximately 3 to 5 minutes). The resin system and curative mixture was used to make 2 individual pressure vessels for Example-3.

The temperature of the resin and curative mixture used to make pressure vessels for EX-3 was maintained between 37° C. and 46° C.

Example 4 (EX-4)

A nanoparticle epoxy product was prepared in the same manner as that of EX-1, except the following materials were added to the 380 liter kettle with agitation to form the feed mixture: 5.36 parts by weight SMS-3, 0.88 parts by weight of SMS-4, 1 part by weight methoxy propanol, 1.0 parts by weight epoxy resin (EPON 826), 0.25 parts by weight a diglycidyl ether of cyclohexane dimethanol (HELOXY 107), and 0.30 parts by weight coreshell rubber (KANEKA MX-257). This feed mixture was subject to the conditions shown in Table 5.

As the resulting resin system containing surface modified nanoparticles dispersed in epoxy resin cooled, it thickened to a sticky, liquid resin which was analyzed by TGA and GC. The TGA results showed the silica solids to be 48.73 wt % in the resin system. Analysis of residual solvent by GC showed no detectable amounts of methoxy propanol and no detectable amount of water left in the resin system.

Preparation of the resin and curative mixture used to make pressure vessels. Into a plastic bucket, 2.22 parts by weight of the nanoparticle epoxy product were measured along with 1.00 parts by weight of a liquid anhydride curative with promoter (LINDRIDE 36Y). The resins were mixed by hand with a wooden stir stick until well mixed (approximately 3 to 5 minutes). The resin system and curative mixture was used to make 2 individual pressure vessels for Example-4.

The temperature of the resin and curative mixture used to make pressure vessels for EX-4 was maintained between 41° C. and 51° C.

The pressure vessels of CE-2, EX-3 and EX-4 were prepared in the same manner with the same equipment, with the same lot of fiber (T700SC), with the same type of aluminum liner, and cured in the same manner as CE-1 and EX-1 and EX-2. The only exceptions are the different resin bath temperatures listed explicitly in EX-3 and EX-4. The winding pattern speeds were not recorded for CE-2, EX-3 and EX-4. The weight and diameter of each aluminum liner was recorded before the filament winding process and again after the winding and curing steps. The results are summarized in Table 6.

TABLE 6

Aluminum liner weight and diameter, and fiber composite cured pressure vessel weight and diameter for CE-2, EX-3 and EX-4.

| Example Number | Cylinder Number | Liner Wt (kg) | Post-Cure Wt (kg) | Liner Diameter (cm) | Post-Cure Vessel Diameter (cm) |
|---|---|---|---|---|---|
| CE-2 | 1 | 2.173 | 2.773 | 15.964 | 16.370 |
| CE-2 | 2 | 2.173 | 2.782 | 15.964 | 16.370 |
| CE-2 | 3 | 2.182 | 2.773 | 157951 | 16.347 |
| CE-2 | 4 | 2.173 | 2.764 | 15.964 | 16.347 |
| CE-2 | 5 | 2.164 | 2.755 | 15.951 | 16.345 |
| EX-3 | 1 | 2.182 | 2.891 | 15.964 | 16.396 |
| EX-3 | 2 | 2.173 | 2.855 | 15.964 | 16.383 |
| EX-4 | 1 | 2.164 | 2.855 | 15.964 | 16.383 |
| EX-4 | 2 | 2.164 | 2.845 | 157964 | 16.383 |

The post-cure weight and diameter of the vessels for EX-3 and EX-4 were greater than the post-cure weight and diameter of the vessels of CE-2. Because all of the vessels of CE-1, CE-2, EX-1, EX-2, EX-3 and EX-4 were made from the same filament winding pattern on the same equipment with the same lot of fiber, they each contained equal weight of carbon fiber. The increase in weight of EX-3 and EX-4 (relative to CE-2) is due to excess resin on the vessel caused by a lack of resin coating and resin bath temperature optimization. Because most of the excess resin was forced to the outside of the vessel during cure (noting a resin-rich appearance on the outside of the cured vessels), the fiber volume of the CE-2 and EX-3 and EX-4 vessels was expected to be approximately equal to the vessels of CE-2 despite the difference in resin weight.

Prior to the hydroburst testing of the pressure vessels of CE-2, EX-3 and EX-4, the empty vessels were subject to an impact from a falling dart (4.54 kg steel rod, approximately 5.1 cm diameter with a hemispherical end) which struck the stationary vessel in the middle of the sidewall. The impact energy of the dart was controlled by manipulation of the height of the dart prior to the drop. The impact energy was calculated as the mass of the dart multiplied by the height from which the dart was released. Once the falling dart was released from the test height, it was able to strike the vessel sidewall several times after the initial drop until the energy was expended and the dart was motionless in contact with the vessel sidewall. In the damaged area where the dart impacted, a depth measurement was recorded of the permanent deflection of the damaged composite pressure vessel area as it indented from the original outline of the vessel.

After the vessels of CE-2, EX-3 and EX-4 had been subjected to the dart impact, they were hydroburst tested by the same method, and the same finite element analysis method was completed as was used for CE-1, EX1 and EX-2. The results of the damage depth from impact and the hydroburst test results are included in Table 7. The hydroburst results from CE-1 are included in Table 7 for comparison as control vessels that were not subject to impact damage prior to hydroburst testing.

2329K, 40.67 wt % silica in an aqueous dispersion, lot BP0F1998A0) to an open head stainless steel mixing vessel. Next, 1.00 parts by weight methoxy propanol was added slowly while agitating, and then 0.0208 parts by weight of trimethoxy phenyl silane was slowly added to the mixture. The mixture was allowed to agitate with a pneumatically-driven impeller for 30 minutes.

The same continuous flow hydrothermal reactor and reaction conditions described to make SMS-2 was used to prepare SMS-5. The effluent from the hydrothermal reactor was identified as SMS-5.

TABLE 7

Hydroburst test, impact energy, damage depth and fiber delivered strength results for CE-1, CE-2, EX-3 and EX-4.

| Example Number | Cylinder Number | Impact Energy (kg*m) | Depth of Damage (cm) | Delivered Fiber Strength (MPa) | Average Delivered Fiber Strength (MPa) | Avg. % of Control Sample Fiber Strength* | Avg. % of Virgin Fiber Strength** |
|---|---|---|---|---|---|---|---|
| CE-1 | 1 | 0 | NA | 4981 | 5018 | NA | |
| CE-1 | 2 | 0 | NA | 4925 | | NA | 100 |
| CE-1 | 3 | 0 | NA | 5147 | | NA | |
| CE-2 | 1 | 1.4 | 0.00 | 4908 | | NA | 97.7 |
| CE-2 | 2 | 2.8 | 0.13 | 4635 | | NA | 92.4 |
| CE-2 | 3 | 4.2 | 0.18 | 4928 | | NA | 98.2 |
| CE-2 | 4 | 8.3 | 0.28 | 4511 | | NA | 89.9 |
| CE-2 | 5 | 16.6 | 1.03 | 2944 | 2944 | 100 | 58.7 |
| EX-3 | 1 | 16.6 | 0.75 | 3960 | 3817 | 129.6 | 71.6 |
| EX-3 | 2 | 16.6 | 0.81 | 3674 | | | |
| EX-4 | 1 | 16.6 | 0.69 | 4385 | 4131 | 140.3 | 76.6 |
| EX-4 | 2 | 16.6 | 0.58 | 3878 | | | |

*The average percentage of control sample fiber strength was calculated by dividing the delivered fiber strength of the article (or average of 2 articles, when applicable) by the delivered fiber strength of the control test vessel (CE-2 vessel #5) after a 365.8 cm impact drop, which showed 2944 MPa (427.0 ksi) and multiplying by 100.
**The average percentage of virgin fiber strength was calculated by dividing the delivered fiber strength of the article (or average of 2 articles, when applicable) by the average delivered fiber strength of the virgin (no impact) control test vessel (CE-1 vessels #1-3), which showed a delivered fiber strength of 5018 MPa (727.7 ksi) and multiplying by 100.

Comparative Example 3 (CE-3)

Pressure vessel articles for Comparative Example 3 were made in an identical manner to Comparative Examples 1 and 2, except that 4 vessels were prepared, and they were filament wound with a different composite pattern to provide vessels that were more appropriate for cycle (fatigue) testing. The vessels for CE-1 and CE-2 were intended only for burst testing, not cycle (fatigue) testing. The differences between the vessels of CE-1, CE-2 and those of CE-3 are illustrated by the increase in the post-cure liner diameter and weight (Table 3, Table 6 and Table 8, respectively) and hydroburst pressure, and in the delivered fiber strength from the hydroburst evaluation (Table 9). CE-3 vessels had a composite layer thickness approximately twice as thick as the vessels of CE-1 and CE-2. As shown in Table 9, the delivered fiber strength from the hydroburst test of CE-3 vessel was 4268 MPa (619.1 ksi) whereas that for the CE-1 vessels average fiber delivered strength was approximately 5018 MPa (727.7 ksi). As is typical for pressure vessel construction, the delivered fiber strength of any particular fiber shows a decrease as the composite layer thickness on the vessel is increased.

Example 5 (EX-5)

A fiber composite comprising a resin system containing surface-modified silica nanoparticles was prepared as follows. Surface-modified silica nanoparticles were prepared by charging 1.69 parts by weight of silica sol (NALCO A nanoparticle epoxy product was prepared in the same manner as that of EX-1, except the following materials were added to the 380 liter kettle with agitation to form the feed mixture: 5.36 parts by weight SMS-5, 0.87 parts by weight of SMS-4, 1 part by weight methoxy propanol, 1.18 parts by weight epoxy resin (EPON 826), and 0.30 parts by weight a diglycidyl ether of cyclohexane dimethanol (HELOXY 107). This feed mixture was subject to the conditions shown in Table 5.

As the resulting resin system containing surface modified nanoparticles dispersed in epoxy resin cooled, it thickened to a sticky, liquid resin which was analyzed by TGA and GC. The TGA results showed the silica solids to be 49.16 wt % in the resin system. Analysis of residual solvent by GC showed no detectable amounts of methoxy propanol and no detectable amount of water left in the resin system.

Preparation of the resin and curative mixture used to make pressure vessels. Into a plastic bucket, 2.13 parts by weight of the nanoparticle epoxy product were measured along with 1.00 parts by weight of a liquid anhydride curative with promoter (LINDRIDE 36Y). The resins were mixed by hand with a wooden stir stick until well mixed (approximately 3 to 5 minutes). The resin system and curative mixture was used to make 3 individual pressure vessels for Example-5.

The pressure vessels of EX-5 were prepared in an identical manner to those of CE-3, except that only three vessels were prepared and the temperature of the resin in the fiber coating bath was maintained between 27° C. to 32° C. The weight and diameter of each aluminum liner was recorded before the filament winding process and again after the winding and curing steps. The results for the vessels of CE-3 and EX-5 are summarized in Table 8.

TABLE 8

Aluminum liner weight and diameter, and fiber composite cured pressure vessel weight and diameter for CE-3 and EX-5, vessels prepared for hydroburst and cycle (fatigue) testing.

| Example Number | Cylinder Number | Liner Wt (kg) | Post-Cure Wt (kg) | Liner Diameter (cm) | Post-Cure Vessel Diameter (cm) |
|---|---|---|---|---|---|
| CE-3 | 1 | 2.164 | 3.864 | 15.964 | 16.977 |
| CE-3 | 2 | 2.173 | 3.864 | 15.964 | 16.967 |
| CE-3 | 3 | 2.173 | 3.864 | 15.964 | 16.982 |
| CE-3 | 4 | 2.164 | 3.855 | 15.951 | 16.985 |
| EX-5 | 1 | 2.173 | 4.091 | 15.959 | 17.059 |
| EX-5 | 2 | 2.164 | 4.082 | 15.951 | 17.056 |
| EX-5 | 3 | 2.164 | 4.109 | 15.951 | 17.082 |

The post-cure weight and diameter of the vessels for EX-5 were greater than the post-cure weight and diameter of the vessels of CE-3. Because the vessels of CE-3 and EX-5 were made from the same filament winding pattern on the same equipment with the same lot of fiber, they each contained equal weight of carbon fiber. The increase in weight of EX-5 (relative to CE-3) is due to excess resin on the vessel caused by a lack of resin coating and resin bath temperature optimization. Because most of the excess resin was forced to the outside of the vessel during cure (noting a resin-rich appearance on the outside of the cured vessels), the fiber volume of the CE-3 and EX-5 vessels was expected to be approximately equal despite the difference in resin weight.

Cured Vessel #1 of CE-3 was tested in hydroburst evaluation in the same manner as previously described for CE-1, CE-2, and EX-1 to EX-4, including the rate of pressure increase, but the time required to reach the ultimate burst pressure was greater than that in CE-1, CE-2, EX-1 to EX-4 due to the higher burst pressure of CE-3. Table 9 contains a comparison of the burst pressure for the vessels of CE-3 and CE-1 and the delivered fiber strength calculated by the previously-described finite element model analysis used for CE-1 and EX-1 and EX-2.

TABLE 9

Hydroburst Pressure and delivered fiber strength for CE-3 Vessel #1 and CE-1 Vessels #1-3

| Example Number | Cylinder Number | Burst Pressure (MPa) | Delivered Fiber Strength (MPa) |
|---|---|---|---|
| CE-3 | 1 | 92 | 4269 |
| CE-1 | 1 | 44 | 4981 |
| CE-1 | 2 | 43 | 4925 |
| CE-1 | 3 | 45 | 5147 |

The burst pressure for CE-3 was significantly increased from that of CE-1 due to the different filament winding pattern and much thicker composite layer (which was appropriate for the cycle (fatigue) testing). Notably, however, the delivered fiber strength was less for CE-3 than it was in CE-1 despite the use of the same carbon fiber (the same lot of fiber), the same resin, and the same curing conditions. The decrease in delivered fiber strength is accepted in the industry as a consequence of the increased thickness of the composite layer.

Cycle Testing. The three remaining cylinders of CE-3 and three cylinders of EX-5 intended for cycle (fatigue) testing were subject to autofrettage prior to the cycle tests. The autofrettage consisted of a 58.6 MPa (8500 psi) hold for 2 minutes and hydrostatic test at 37.9 MPa (5500 psi) for 1 minute prior to the commencement of the cycle testing. The cyclic test cycled the vessels between (less than or equal to) 3.1 MPa and 31.0 MPa (4500 psi) using a liquid solution of 25/75 weight ratio of glycol to water at a rate not in excess of 10 cycles per minute. The minimum dwell time in the pressure range between 90 and 100 percent of the upper cyclic pressure was not less than 1.2 seconds. The vessels were cycle tested in parallel using a manifold setup, so they were all exposed to the same cycle testing. The number of cycles to failure (Upper Cyclic Pressure Cycles) was reported for each vessel in addition to the failure location. All the vessels of CE-3 and EX-5 showed failure locations in the vessel sidewall.

A summary of the results of the cycle (fatigue) test is included in Table 10 for CE-3 and EX-5.

TABLE 10

Results of Cycle Test on the vessels of CE-3 and EX-5.

| Example Number | Cycle Count | Average Cycle Count | Coefficient of Variation (%) |
|---|---|---|---|
| CE-3 | 6214 | | |
| CE-3 | 6458 | 6689 | 9.3 |
| CE-3 | 7394 | | |
| EX-5 | 8588 | | |
| EX-5 | 12400* | 10399 | 18.4 |
| EX-5 | 10210* | | |

*These two cycle tests were terminated at 10,000 cycles for a few days and then the cycle testing resumed.

The coefficient of variation accepted in the industry for cycle (fatigue) evaluation is 20%. Both the CE-3 and EX-5 vessels show less than 20% coefficient of variation.

Table 10 shows a 55% increase in the average cycles to failure of the EX-5 vessels in comparison to the CE-3 vessels. This is a very significant increase in the cycle life of the vessels considering the vessel design was the same, and only the matrix resin was different between CE-3 and EX-5. Higher cycle life enables composite re-design for lower weight and longer-life pressure vessels.

The present inventors have discovered that a very significant improvement in composite fiber strength after impact damage could be achieved by incorporating surface-modified nanoparticles, and (in some cases) coreshell nanoparticles in the matrix resin. For example, a 29.6% improvement in delivered fiber strength after impact was achieved by incorporating surface-modified nanoparticles in the matrix resin when compared to a control with no surface-modified nanoparticles. For example, a 40.3% improvement in delivered fiber strength after impact was achieved by incorporating surface-modified nanoparticles and core shell particles in the matrix resin when compared to a control with no surface-modified nanoparticles and no core shell particles. The present inventors have also shown that a very significant improvement in pressure vessel cycle life results from the inclusion of the surface-modified nanoparticles in the matrix resin.

Generally, the pressure vessels of the present disclosure may be designed to contain fluids have an absolute pressure of at least 2 MPa, e.g., at least 5 MPa, at least 10 MPa, at least 20 MPa, at least 30 MPa, at least 40 MPa, at least 50 MPa, at least 60 MPa, at least 70 MPa, at least 80 MPa, at least 90 MPa, or even greater. The pressure vessels of the present disclosure may be used for any of the wide variety of applications associated with pressure vessels, including, e.g., pipe and conduits, storage containers, and structures exposed to transient elevated pressures.

Various modifications and alterations of this invention will become apparent to those skilled in the art without departing from the scope and spirit of this invention.

What is claimed is:

1. A pressure vessel comprising
a wall circumferentially enclosing an open volume capable of being filled with a fluid, wherein the wall comprises an interior surface adjacent the open volume and an exterior surface opposite the interior surface, a first end, a second end, and an axial direction;
wherein the wall comprises a composite layer comprising a resin system impregnated with fibers and a plurality of surface-modified nanoparticles, and further wherein the surface-modified nanoparticles comprise a core comprising calcite and a surface-modifying agent ionically associated with the core.

2. The pressure vessel of claim 1, wherein the pressure vessel wherein at least one composite layer comprises fibers aligned at angle of greater than 70 degrees relative to the axial direction.

3. The pressure vessel of claim 2, wherein at least one composite layer comprises fibers aligned at angle of no greater than 40 degrees relative to the axial direction.

4. The pressure vessel of claim 1, wherein at least one composite layer comprises fibers aligned at angle of between 40 and 70 degrees, inclusive, relative to the axial direction.

5. The pressure vessel according to claim 1, further comprising a first cap extending from the wall adjacent the first end, further enclosing the open volume.

6. The pressure vessel of claim 5, further comprising a second cap extending from the wall adjacent the second end, isolating the open volume from the ambient environment surrounding the pressure vessel.

7. The pressure vessel according to claim 1, wherein a cross section of the wall perpendicular to the axial direction is elliptical.

8. The pressure vessel of claim 1, wherein the pressure vessel is ellipsoidal.

9. The pressure vessel according to claim 1, wherein the curable matrix resin comprises an epoxy.

10. The pressure vessel according to claim 1, wherein the resin system further comprises a rubber toughener.

11. The pressure vessel according to claim 1, wherein the wall further comprises a liner having an interior surface adjacent the open space and an exterior surface, wherein the composite layer is adjacent the exterior surface of the liner.

12. The pressure vessel of claim 11, wherein the liner comprises at least one a metal and a polymer.

13. The pressure vessel according claim 1, wherein the open volume contains a fluid at an absolute pressure of at least 10 MPa.

14. The pressure vessel according to claim 1, wherein the open volume contains a fluid at an absolute pressure of at least 30 MPa.

15. The pressure vessel according to claim 1, wherein the open volume contains a fluid at an absolute pressure of at least 80 MPa.

16. The pressure vessel according to claim 10, wherein the rubber toughener comprises a coreshell rubber.

17. The pressure vessel according to claim 1, wherein the surface modifying agent comprises a phosphonic acid group.

18. The pressure vessel according to claim 1, wherein the surface modifying agent comprises a sulfonic acid group.

19. The pressure vessel according to claim 1, wherein the surface modifying agent comprises a binding group having a bond energy to the core of at least 0.6 electron volts.

* * * * *